(12) United States Patent
Sahraei et al.

(10) Patent No.: US 11,621,799 B2
(45) Date of Patent: Apr. 4, 2023

(54) PEAK-TO-AVERAGE POWER RATIO REDUCTION

(71) Applicant: QUALCOMM Incorporated, San Diego, CA (US)

(72) Inventors: Saeid Sahraei, San Diego, CA (US); Hung Dinh Ly, San Diego, CA (US); Tingfang Ji, San Diego, CA (US); Krishna Kiran Mukkavilli, San Diego, CA (US); Hwan Joon Kwon, San Diego, CA (US); June Namgoong, San Diego, CA (US); Taesang Yoo, San Diego, CA (US); Shimman Arvind Patel, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/248,846

(22) Filed: Feb. 10, 2021

(65) Prior Publication Data

US 2021/0351868 A1 Nov. 11, 2021

Related U.S. Application Data

(60) Provisional application No. 63/022,093, filed on May 8, 2020.

(51) Int. Cl.
*H04L 1/00* (2006.01)
*H04L 5/00* (2006.01)
(Continued)

(52) U.S. Cl.
CPC .......... *H04L 1/0071* (2013.01); *H04L 5/0007* (2013.01); *H04L 27/18* (2013.01); *H04L 27/2614* (2013.01); *H04L 27/34* (2013.01)

(58) Field of Classification Search
CPC ..... H04L 1/0071; H04L 5/0007; H04L 27/18; H04L 27/2614; H04L 27/34;
(Continued)

(56) References Cited

U.S. PATENT DOCUMENTS

| | | | |
|---|---|---|---|
| 2007/0081580 A1* | 4/2007 | Breiling | H04B 1/7075 375/150 |
| 2008/0049706 A1* | 2/2008 | Khandekar | H04J 13/0003 370/342 |

(Continued)

FOREIGN PATENT DOCUMENTS

WO WO-2021226611 A1 * 11/2021 ........... H04L 1/0071

OTHER PUBLICATIONS

"Reducing Peak to Average Power Ratio of OFDM by Using Selected Mapping"; Mohamed; May 2012 (Year: 2012).*

(Continued)

*Primary Examiner* — Benjamin H Elliott, IV
(74) *Attorney, Agent, or Firm* — Harrity & Harrity LLP/Qualcomm Incorporated (57) ABSTRACT

Various aspects of the present disclosure generally relate to wireless communication. In some aspects, a user equipment (UE) may interleave a signal, that is to be transmitted using discrete Fourier transform (DFT) spread orthogonal frequency-division multiplexing (DFT-s-OFDM), and a negative of the signal to obtain an interleaved signal prior to performing a DFT on the interleaved signal. The UE may transmit a DFT-s-OFDM signal that is based at least in part on the interleaved signal. Numerous other aspects are provided.

28 Claims, 8 Drawing Sheets

(51) Int. Cl.
*H04L 27/26* (2006.01)
*H04L 27/34* (2006.01)
*H04L 27/18* (2006.01)

(58) Field of Classification Search
CPC ... H04L 5/0048; H04L 5/0051; H04L 5/0053; H04L 27/2636; H04L 27/2618; H04L 27/2626; H04L 27/26; H04L 1/00; H04L 27/26526
See application file for complete search history.

(56) References Cited

U.S. PATENT DOCUMENTS

| | | | | |
|---|---|---|---|---|
| 2011/0228878 | A1* | 9/2011 | Sorrentino | H04L 5/0023 375/295 |
| 2012/0294272 | A1* | 11/2012 | Han | H04L 1/1607 370/329 |
| 2014/0362832 | A1* | 12/2014 | Rudolf | H04L 1/1678 370/336 |
| 2016/0192385 | A1* | 6/2016 | Tooher | H04L 27/2602 370/336 |
| 2018/0048512 | A1* | 2/2018 | Zeng | H04L 25/03834 |
| 2018/0054218 | A1* | 2/2018 | Qian | H04L 5/005 |
| 2018/0145803 | A1* | 5/2018 | Park | H04L 5/0007 |
| 2018/0212810 | A1* | 7/2018 | Park | H04L 27/2636 |
| 2018/0309496 | A1* | 10/2018 | Lee | H04L 5/0044 |
| 2019/0052486 | A1* | 2/2019 | Kuchi | H04L 27/2644 |
| 2019/0116004 | A1* | 4/2019 | Goto | H04L 1/16 |
| 2019/0181910 | A1* | 6/2019 | Goto | H04B 1/7103 |
| 2019/0222455 | A1* | 7/2019 | Sahin | H04L 27/2636 |
| 2020/0044897 | A1* | 2/2020 | Qu | H04L 5/0007 |
| 2020/0045691 | A1* | 2/2020 | Park | H04L 5/0048 |
| 2020/0052948 | A1* | 2/2020 | Sahin | H04L 27/2607 |
| 2020/0252954 | A1* | 8/2020 | Kim | H04L 1/0061 |
| 2020/0336354 | A1* | 10/2020 | Zhang | H04L 27/262 |
| 2020/0396730 | A1* | 12/2020 | Kim | H04W 72/0413 |
| 2021/0067391 | A1* | 3/2021 | Sengupta | H04L 27/2613 |
| 2021/0203538 | A1* | 7/2021 | Kim | H04L 27/34 |
| 2021/0226836 | A1* | 7/2021 | Sahin | H04W 4/70 |
| 2021/0351868 | A1* | 11/2021 | Sahraei | H04L 27/34 |
| 2022/0150948 | A1* | 5/2022 | Chen | H04B 1/713 |
| 2022/0166586 | A1* | 5/2022 | Kun | H04L 5/0037 |

OTHER PUBLICATIONS

"Performance Analysis of SC-FDMA and OFDMA in the Presence of Receiver Phase Noise"; Sridharan et al.; IEEE Transactions on Communications on Apr. 10, 2011. IEEE International Symposium on Personal, Indoor and Mobile Radio Communications (PIMRC) (Year: 2011).*

International Search Report for WO 2021/226611 A1; dated Jun. 2021 (Year: 2021).*

International Search Report and Written Opinion—PCT/US2021/070373—ISA/EPO—Jun. 28, 2021.

Qualcomm Incorporated: "UL Signals and Channels for NR-U", 3GPP Draft, 3GPP TSG RAN WG1 Meeting #99, R1-1912937, 3rd Generation Partnership Project (3GPP), Mobile Competence Centre, 650, Route Des Lucioles, F-06921 Sophia-Antipolis Cedex, France, vol. RAN WG1. No. Reno, Nevada, US, Nov. 18, 2019-Nov. 22, 2019, Nov. 9, 2019 (Nov. 9, 2019), XP051823700, pp. 1-24, Retrieved from the Internet: URL: https://ftp.3gpp.org/tsg_ran/WG1_RL1/TSGR1_99/Docs/R1-1912937.zip, R1-1912937 7.2.2.1.3 UL signals and channels for NR-U.docx [retrieved on Nov. 9, 2019] paragraph [03.4] figure 2, p. 8 p. 10. paragraph 3.1—p. 14,.paragraph 3.4, p. 16. paragraph 3.6.

* cited by examiner

PEAK-TO-AVERAGE POWER RATIO REDUCTION

CROSS-REFERENCE TO RELATED APPLICATION

This patent application claims priority to U.S. Provisional Patent Application No. 63/022,093, filed on May 8, 2020, entitled "PEAK-TO-AVERAGE POWER RATIO REDUCTION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for peak-to-average power ratio (PAPR) reduction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include interleaving a signal, that is to be transmitted using discrete Fourier transform (DFT) spread orthogonal frequency-division multiplexing (DFT-s-OFDM), and a negative of the signal to obtain an interleaved signal prior to performing a DFT on the interleaved signal; and transmitting a DFT-s-OFDM signal that is based at least in part on the interleaved signal.

In some aspects, a UE for wireless communication may include a memory and one or more processors operatively coupled to the memory. The memory and the one or more processors may be configured to interleave a signal, that is to be transmitted using DFT-s-OFDM, and a negative of the signal to obtain an interleaved signal prior to performing a DFT on the interleaved signal; and transmit a DFT-s-OFDM signal that is based at least in part on the interleaved signal.

In some aspects, a non-transitory computer-readable medium may store one or more instructions for wireless communication. The one or more instructions, when executed by one or more processors of a UE, may cause the one or more processors to interleave a signal, that is to be transmitted using DFT-s-OFDM, and a negative of the signal to obtain an interleaved signal prior to performing a DFT on the interleaved signal; and transmit a DFT-s-OFDM signal that is based at least in part on the interleaved signal.

In some aspects, an apparatus for wireless communication may include means for interleaving a signal, that is to be transmitted using DFT-s-OFDM, and a negative of the signal to obtain an interleaved signal prior to performing a DFT on the interleaved signal; and means for transmitting a DFT-s-OFDM signal that is based at least in part on the interleaved signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
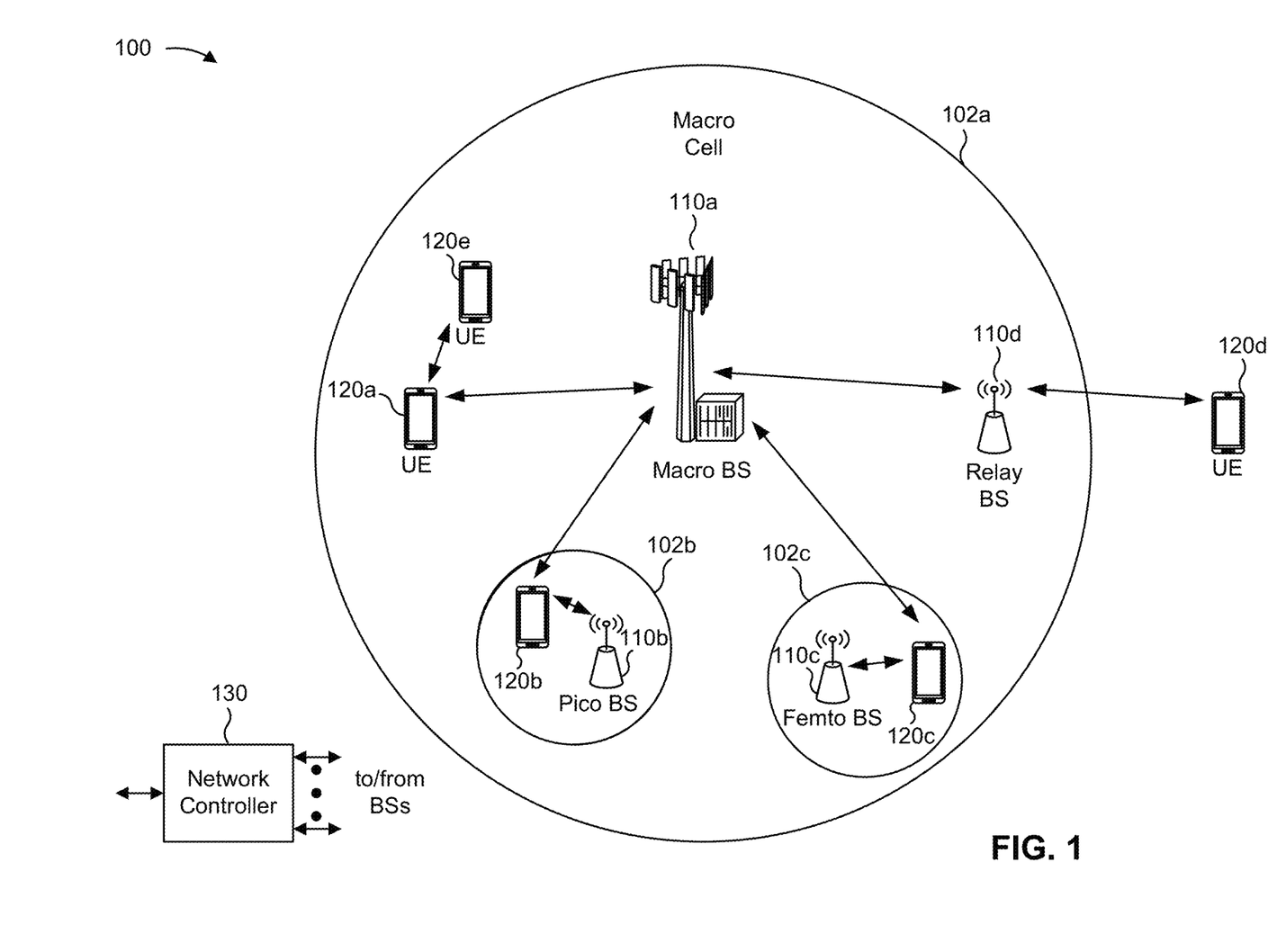
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
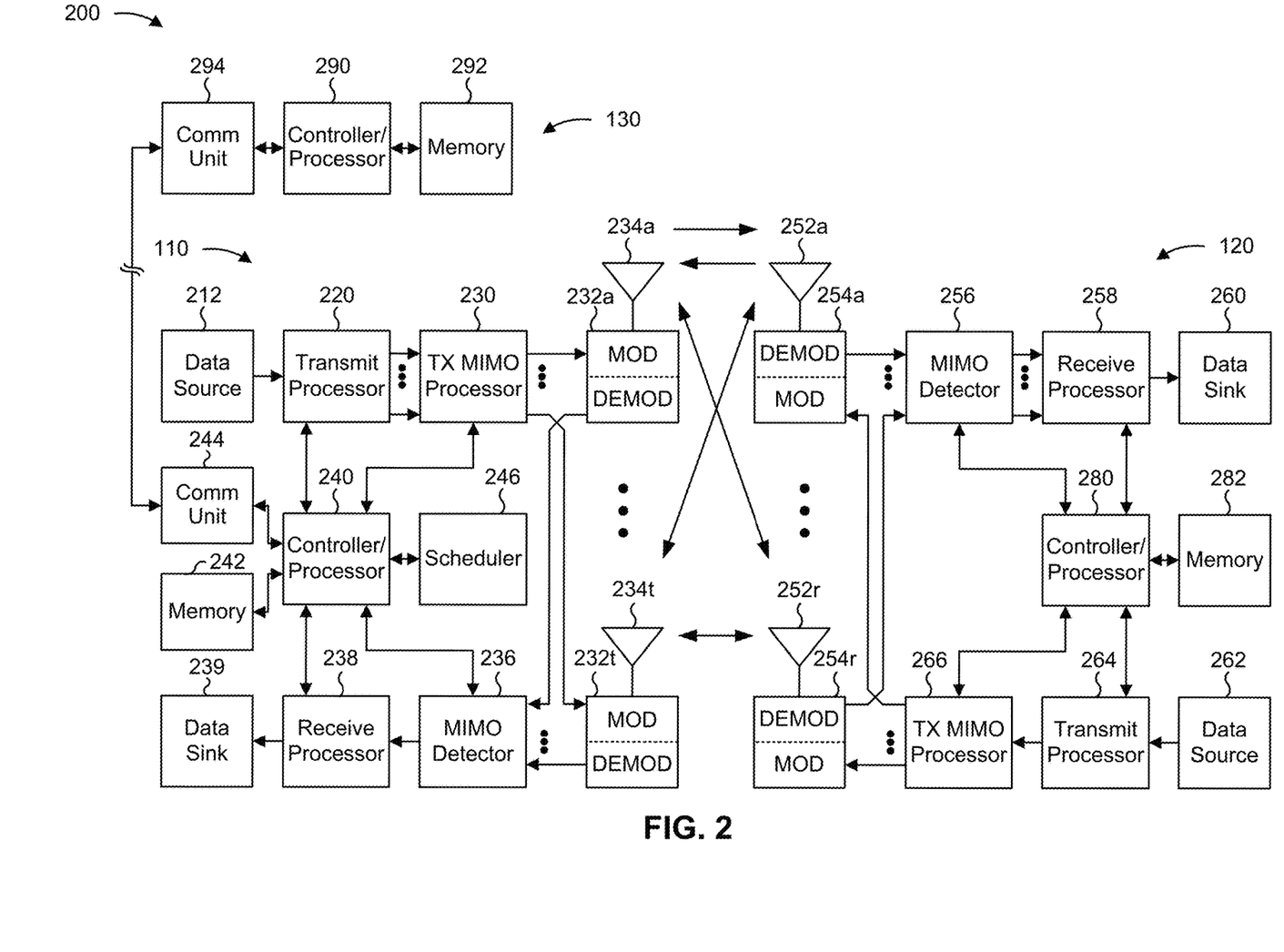
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5A, 5B, 6, and 7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5A, 5B, 6, and 7.

Controller/processor 240 of base station 110, controller/processor 280 of UE 120, and/or any other component(s) of FIG. 2 may perform one or more techniques associated with PAPR reduction, as described in more detail elsewhere herein. For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some aspects, executing instructions may include miming the instructions, converting the instructions, compiling the instructions, and/or interpreting the instructions, among other examples.

In some aspects, UE 120 may include means for determining a signal that is to be transmitted using DFT-s-OFDM, means for interleaving the signal and a negative of the signal to obtain an interleaved signal prior to performing a DFT on the interleaved signal, and/or means for transmitting a DFT-s-OFDM signal that is based at least in part on the interleaved signal. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
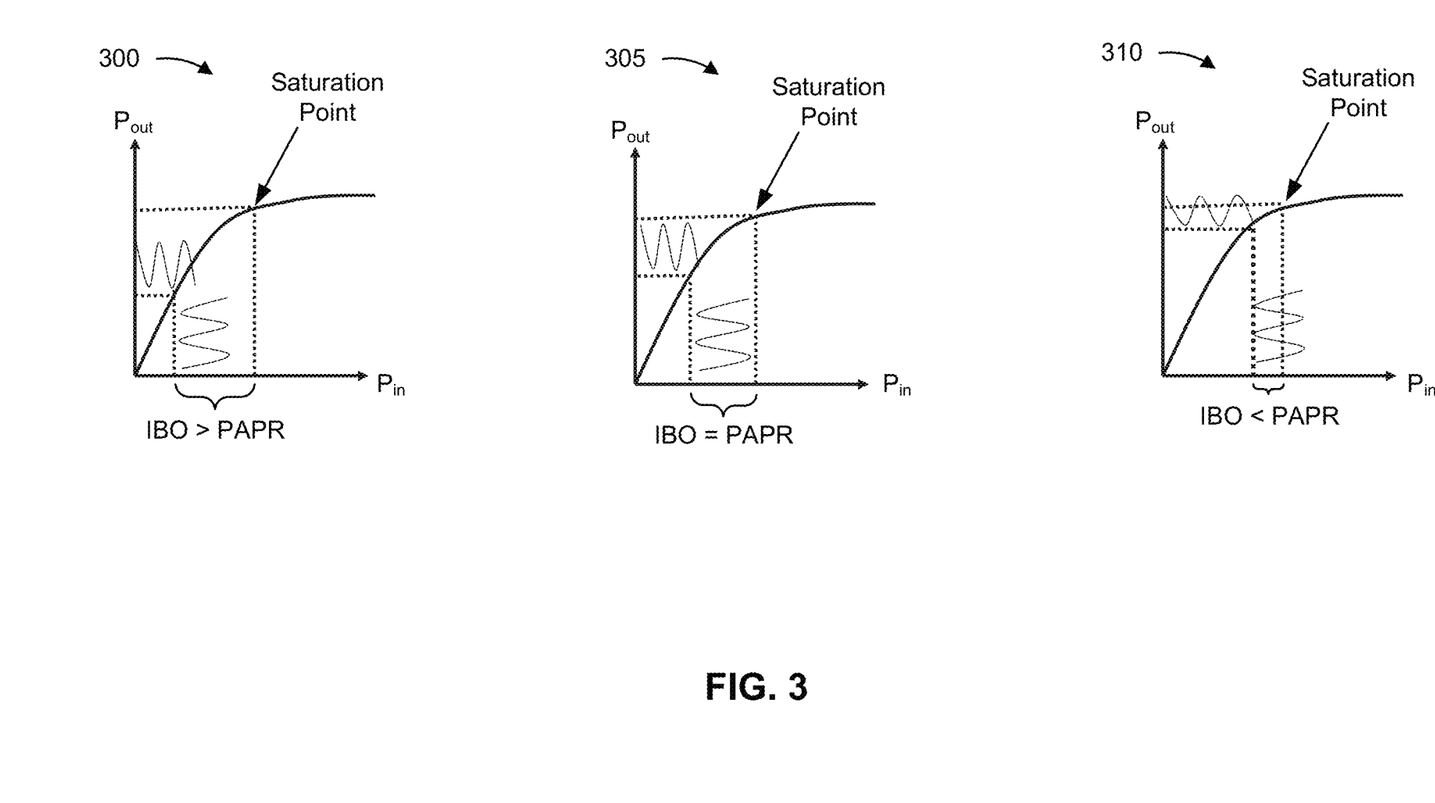
FIG. 3 is a diagram illustrating examples of power amplification, in accordance with the present disclosure.

FIG. 3 is a diagram illustrating examples 300, 305, and 310 of power amplification, in accordance with the present disclosure.

A transmitter may employ a power amplifier to amplify a transmit power of a signal that is transmitted by the transmitter. As shown in FIG. 3, a power amplifier may experience non-linear behavior at high input powers (Pin). For example, an output power (Pout) of a power amplifier has a linear relationship with low input powers, and a non-linear relationship with high input powers. This non-linear relationship may result in distortion (e.g., in-band distortion and/or out-of-band distortion) of a signal, as well as error vector magnitude (EVM) degradation at a receiver of the signal.

To avoid non-linearity in a power amplifier, the power amplifier may operate at a mean input power that is less than a saturation point (e.g., an input power above which the input power and the output power have a non-linear relationship). In some cases, an input power used for a power amplifier may be correlated with a peak-to-average power ratio (PAPR) associated with a signal. For example, if a signal is associated with a PAPR of x decibels (dB), an input backoff (IBO) from the saturation point may be x dB. In this way, peaks of the input power do not exceed the saturation point.

However, use of an IBO may affect a performance of a power amplifier. As shown by example 300, if an IBO is greater than a PAPR, a transmit power used by a transmitter may be overly restricted, and the transmitter may not transmit a signal with enough power to reach a receiver. As shown by example 310, if an IBO is less than a PAPR, the transmitter's use of a greater transmit power may cause peaks of a signal to exceed the saturation point and result in distortion. As shown by example 305, if an IBO is equal to a PAPR, the transmitter may use a maximum transmit power that does not cause distortion. However, in this case, if the PAPR is large, then the maximum transmit power that does not cause distortion may be less power than is needed by a transmitter to reach a receiver (e.g., if the transmitter and the receiver are located far apart). Thus, it is beneficial to reduce a PAPR by as much as possible, to thereby reduce an IBO and increase a maximum transmit power that can be used by the transmitter.

Some wireless networks use OFDM signals, which may be associated with a high PAPR. Moreover, a PAPR of OFDM signals increases with a size of an OFDM block, and 5G/NR networks, which use higher data rates relative to 4G/LTE networks, use a larger OFDM block. In some cases, PAPR reduction techniques may be used to reduce a PAPR associated with OFDM signals. However, current PAPR reduction techniques are data-dependent and consume significant processing resources, and are therefore unsuitable for real-time implementation. In some cases, a clipping and filtering technique may be used as an alternative to a PAPR reduction technique. However, a clipping and filtering technique may produce in-band distortion and other undesirable effects.

As indicated above, FIG. 3 is provided as an example. Other examples may differ from what is described with respect to FIG. 3.

Figure 4:
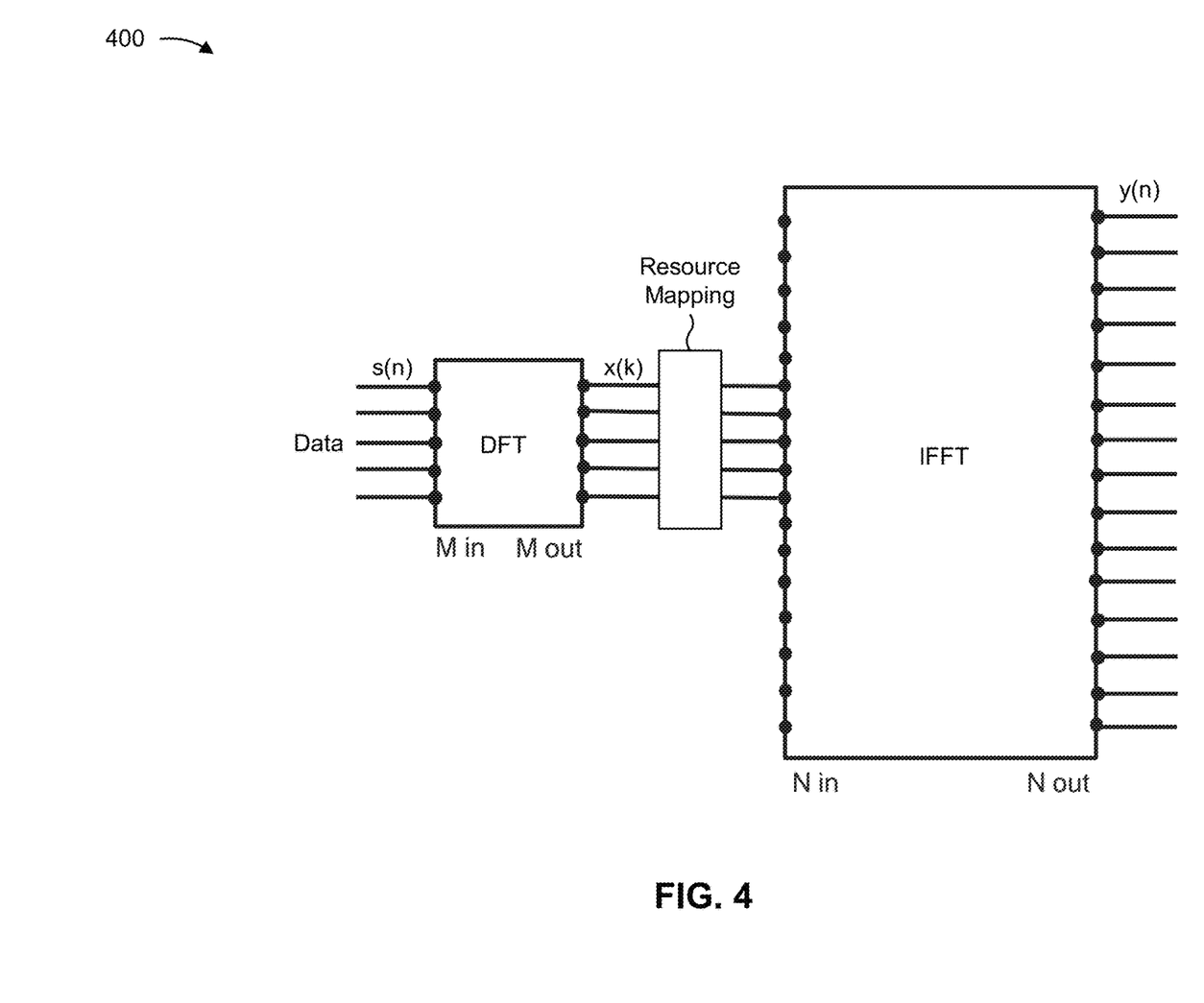
FIG. 4 is a diagram illustrating an example of DFT-s-OFDM, in accordance with the present disclosure.

FIG. 4 is a diagram illustrating an example 400 of DFT-s-OFDM, in accordance with the present disclosure. A UE may use DFT-s-OFDM to generate a DFT-s-OFDM waveform (e.g., a single carrier waveform) for uplink transmission.

As shown in FIG. 4, according to DFT-s-OFDM, data (shown as s(n)) may be processed using a DFT to obtain a DFT output (shown as x(k)). The data may be bit data, such as data modulated by binary phase shift keying (BPSK) modulation, quadrature phase shift keying (QPSK), quadrature amplitude modulation (QAM), and/or the like. The DFT output may be mapped to frequency domain resources. The DFT output mapped to the frequency domain resources may be processed using an inverse fast Fourier transform (IFFT) (e.g., an N-point IFFT) to obtain a time-domain signal (shown as y(n)). In some cases, the time-domain signal (e.g., the DFT-s-OFDM waveform) may be processed using a power amplifier to amplify a transmit power of the time-domain signal.

In some cases, a DFT-s-OFDM signal may be associated with a lower PAPR relative to OFDM signals (e.g., for QPSK modulation, a DFT-s-OFDM signal may be associated with a PAPR that is 3-4 dB less than a PAPR associated with an OFDM signal). Nevertheless, a DFT-s-OFDM signal may be associated with side lobes that produce large peaks in the DFT-s-OFDM signal. Accordingly, further reduction of a PAPR associated with a DFT-s-OFDM signal may enable a UE to use a greater transmit power for uplink transmissions.

Some techniques and apparatuses described herein generate DFT-s-OFDM signals with improved PAPR. For example, a UE may interleave a signal with a negative of the signal to obtain an interleaved signal prior to performing a DFT on the interleaved signal. In some aspects, interleaving a signal with a negative of the signal may be referred to as a reverse combination (or a reverse comb) procedure. In this way, a DFT-s-OFDM signal based at least in part on the interleaved signal may be associated with a reduced PAPR. Accordingly, an IBO used for a power amplifier may be reduced, which may enable a UE to use a greater transmit power for uplink transmissions and thereby improve uplink performance.

As indicated above, FIG. 4 is provided as an example. Other examples may differ from what is described with respect to FIG. 4.

Figure 5A:
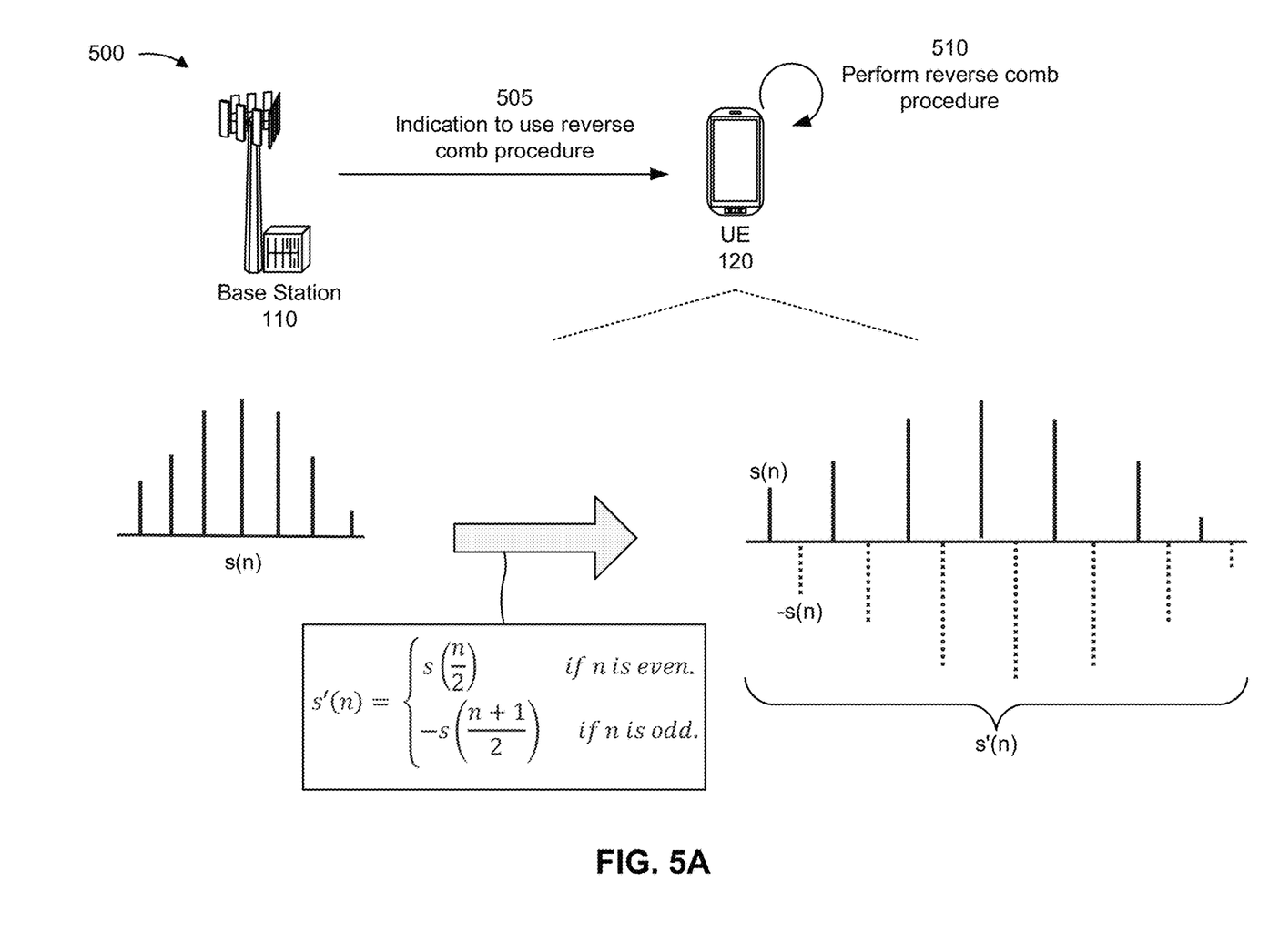
FIGS. 5A and 5B are diagrams illustrating one or more examples of peak-to-average power ratio (PAPR) reduction, in accordance with the present disclosure.
Figure 5B:
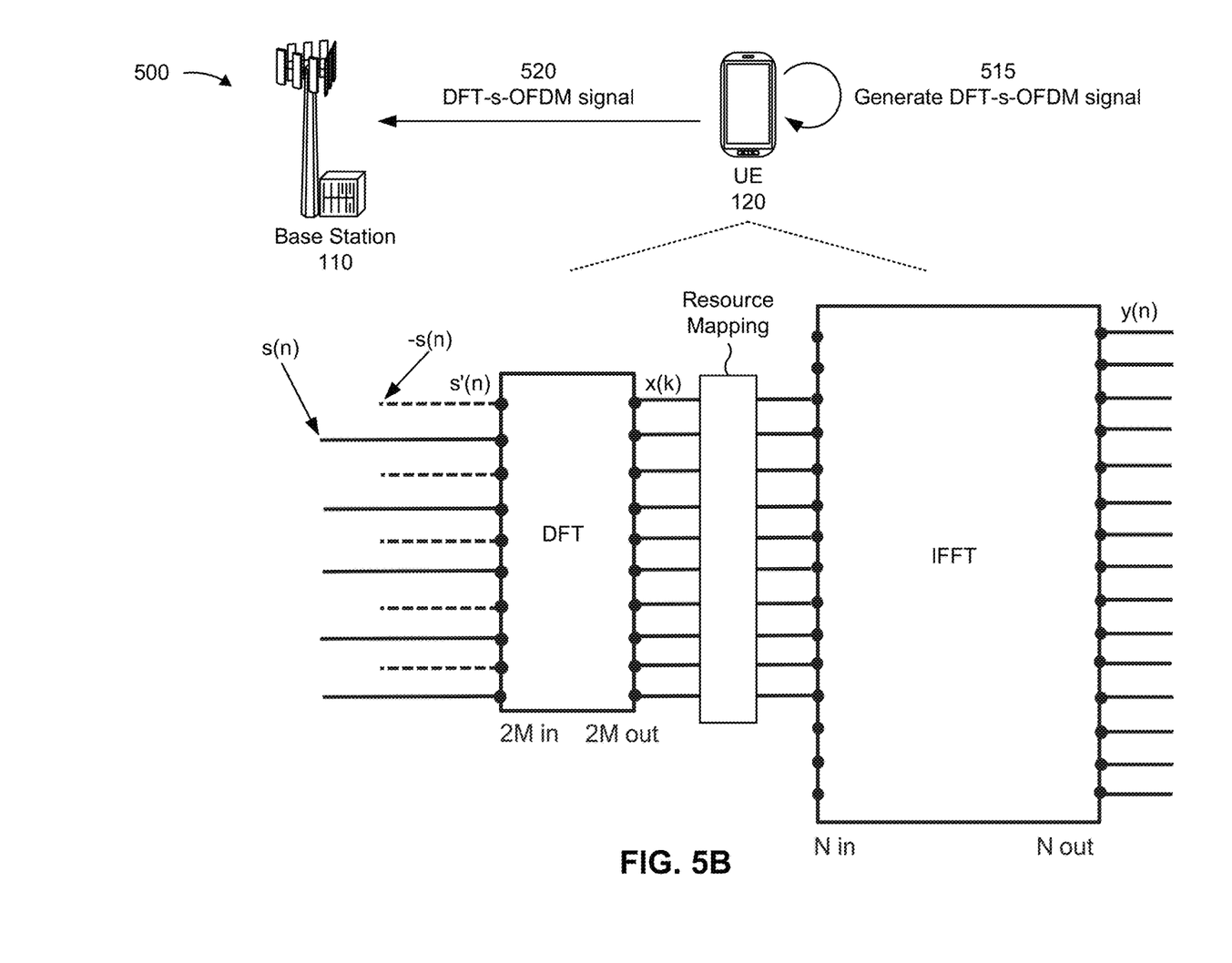

FIGS. 5A and 5B are diagrams illustrating one or more examples 500 of PAPR reduction, in accordance with the present disclosure. As shown in FIGS. 5A and 5B, a base station 110 and a UE 120 may communicate with one another. In some aspects, the UE 120 is to perform an uplink transmission to the base station 110 using a DFT-s-OFDM signal (e.g., a DFT-s-OFDM waveform).

As shown in FIG. 5A, and by reference number 505, the base station 110 may transmit, and the UE 120 may receive, an indication to use a reverse comb procedure for one or more uplink transmissions of the UE 120 (e.g., an indication to interleave the signal with the negative of the signal, as described below). The indication transmitted by the base station 110 may include a single bit (e.g., the single bit may have a value of 1 to indicate that the UE 120 is to use the reverse comb procedure, or a value of 0 to indicate that the UE 120 is not to use the reverse comb procedure). In some aspects, the indication may be, or may be included in, downlink control information (DCI), a medium access control (MAC) control element (MAC-CE), or radio resource control (RRC) signaling.

Use of the reverse comb procedure may increase a bandwidth used for an uplink transmission. Accordingly, in some aspects, the base station 110 may transmit the indication to use the reverse comb procedure based at least in part on a determination that available uplink bandwidth is sufficient for use of the reverse comb procedure.

As shown by reference number 510, the UE 120 may perform the reverse comb procedure. In some aspects, the UE 120 may determine a signal (shown as s(n)) that is to be transmitted using DFT-s-OFDM. The signal may be a data signal (e.g., obtained by the UE 120 from an application executing on the UE 120) and/or a reference signal, such as a DMRS. In some aspects, the signal (e.g., a time-domain signal) may be modulated by a phase shift keying modulation (e.g., QPSK, BPSK, and/or the like), a QAM (e.g., 256-QAM, and/or the like), another modulation type that uses a constellation mapping, and/or the like.

The UE 120 may determine that the signal is to be processed using the reverse comb procedure based at least in part on receiving the indication to use the reverse comb procedure. In some aspects, according to the reverse comb procedure, the UE 120 may interleave (or otherwise combine) the signal and a negative of the signal to obtain an interleaved signal (shown as s'(n), and which has a length of 2M). For example, the UE 120 may interleave the signal and the negative of the signal prior to performing a DFT on the signal, on the negative of the signal, or on the interleaved signal. The UE 120 may determine the negative of the signal by multiplying the signal by −1 (e.g., the negative of the signal has a phase shift of 180 degrees relative to the signal). For example, if a QPSK constellation point of the signal is [+1, −1], the negative of the QPSK constellation point is [−1, +1].

In some aspects, the UE 120 may uniformly interleave the signal and the negative of the signal. In this example, a first element (e.g., a bit, a constellation point, a symbol, and/or the like) of the interleaved signal may be a first element (e.g., a sample, such as an in-phase and quadrature (IQ) sample) of the signal, a second element of the interleaved signal may be a first element of the negative of the signal, a third element of the interleaved signal may be a second element of the signal, and so forth. In some aspects, the UE 120 may not uniformly interleave the signal and the negative of the signal (e.g., a first subset of samples of the signal and the negative of the signal may be interleaved with a second subset of samples of the signal and the negative of the signal).

As shown, the signal may occupy even-numbered elements of the interleaved signal, and the negative of the signal may occupy odd-numbered elements of the interleaved signal. However, in some aspects, the signal may occupy odd-numbered elements of the interleaved signal, and the negative of the signal may occupy even-numbered elements of the interleaved signal. In some aspects, additionally or alternatively to interleaving the signal and the negative of the signal, the UE 120 may interleave (or otherwise combine) the signal and another signal used for PAPR-reduction (e.g., a PAPR-reduction signal) and/or another signal that is based at least in part on a different modification of the signal (e.g., a modification other than a negative of the signal).

As shown in FIG. 5B, and by reference number 515, the UE 120 may generate a DFT-s-OFDM signal (e.g., a DFT-s-OFDM waveform) that is based at least in part on the interleaved signal. In some aspects, the UE 120 may perform (e.g., using a DFT component of the UE 120) a DFT on the interleaved signal to obtain a DFT result (shown as x(k)). In this case, the UE 120 may perform a 2M-point DFT on the interleaved signal to obtain the DFT result (e.g., x=dft(s', 2M)). In some aspects, the UE 120 may map (e.g., using a resource mapping component of the UE 120) the DFT result to frequency resources that the UE 120 is to use for the uplink transmission. In some aspects, the UE 120 may perform (e.g., using an IFFT component of the UE 120) an IFFT on the DFT result mapped to the frequency resources to obtain a time-domain signal (shown as y(n)) (e.g., to obtain the DFT-s-OFDM signal). In this case, the UE 120 may perform an N-point IFFT on the DFT result to obtain the time-domain signal (e.g., y=ifft(x, N)).

As shown by reference number 520, the UE 120 may transmit, and the base station 110 may receive, the DFT-s-OFDM signal (e.g., the UE 120 may perform the uplink transmission of the DFT-s-OFDM signal). In some aspects, the base station 110 may decode the DFT-s-OFDM signal based at least in part on a procedure that is reversed to the procedure described above for generating the DFT-s-OFDM signal and/or reversed to the reverse comb procedure described above. In some aspects, the DFT-s-OFDM signal may be for data symbols and/or reference signal, such as DMRS, symbols. In some aspects, when a DMRS and data are transmitted in DFT-s-OFDM signals generated by the reverse comb procedure, the base station 110 may determine the data symbols (e.g., the pre-interleaving data symbols) according to DMRS-based channel estimation.

In some aspects, the UE 120 may use a transmit power for the DFT-s-OFDM signal that is split equally between the signal portion and the negative of the signal portion of the interleaved signal (e.g., the DFT-s-OFDM signal may be split equally between even elements and odd elements of the interleaved signal). In some aspects, the UE 120 may scale the negative of the signal, relative to the signal, by a scaling value $\alpha$ ($\alpha>0$), and the UE 120 may split the transmit power for the DFT-s-OFDM signal according to the scaling value (e.g., if $\alpha=0.5$, the negative of the signal portion of the interleaved signal uses a transmit power that is one quarter ($\alpha^2$) of a transmit power used for the signal portion of the interleaved signal). In some aspects, the UE 120 may determine the scaling value, or the base station 110 may transmit an indication of the scaling value to the UE 120.

In some aspects, when transmitting the DFT-s-OFDM signal, the UE 120 may amplify a transmit power of the DFT-s-OFDM signal (e.g., using a power amplifier component of the UE 120). In some aspects, the UE 120 may amplify the transmit power using an IBO that is equivalent to (or less than, such as within a threshold value of) a PAPR associated with the DFT-s-OFDM signal (e.g., associated with the DFT-s-OFDM signal generated using the reverse comb procedure). In this way, reduction of the PAPR associated with the DFT-s-OFDM signal permits reduction of the IBO used for the power amplifier.

In some aspects, the PAPR associated with the DFT-s-OFDM signal satisfies (e.g., is less than) a threshold value (e.g., an upper bound). For example, the threshold value may be 7 dB, 6 dB, 5 dB, 4 dB, or 3 dB (e.g., if the interleaved signal is modulated by QPSK modulation). In some aspects, the PAPR associated with the DFT-s-OFDM signal may be less than a PAPR associated with another DFT-s-OFDM signal that is based at least in part on only the signal (e.g., the other DFT-s-OFDM signal is not generated using the reverse comb procedure). For example, the PAPR associated with the DFT-s-OFDM signal may be less than the PAPR associated with the other DFT-s-OFDM signal by at least 1 dB, at least 2 dB, at least 3 dB, or at least 4 dB (e.g., if the interleaved signal is modulated by QPSK modulation).

In this way, using the reverse comb procedure, the UE 120 may transmit the DFT-s-OFDM signal using a higher transmit power than would otherwise be practical, thereby improving a performance of the uplink transmission of the UE 120. Moreover, the reverse comb procedure reduces distortion of the DFT-s-OFDM signal (e.g., in-band distortion and/or out-of-band distortion). Additionally, the reverse comb procedure has low complexity, and therefore does not consume significant processing resources, battery resources, and/or the like, of the UE 120.

As indicated above, FIGS. 5A and 5B are provided as one or more examples. Other examples may differ from what is described with respect to FIGS. 5A and 5B.

Figure 6:
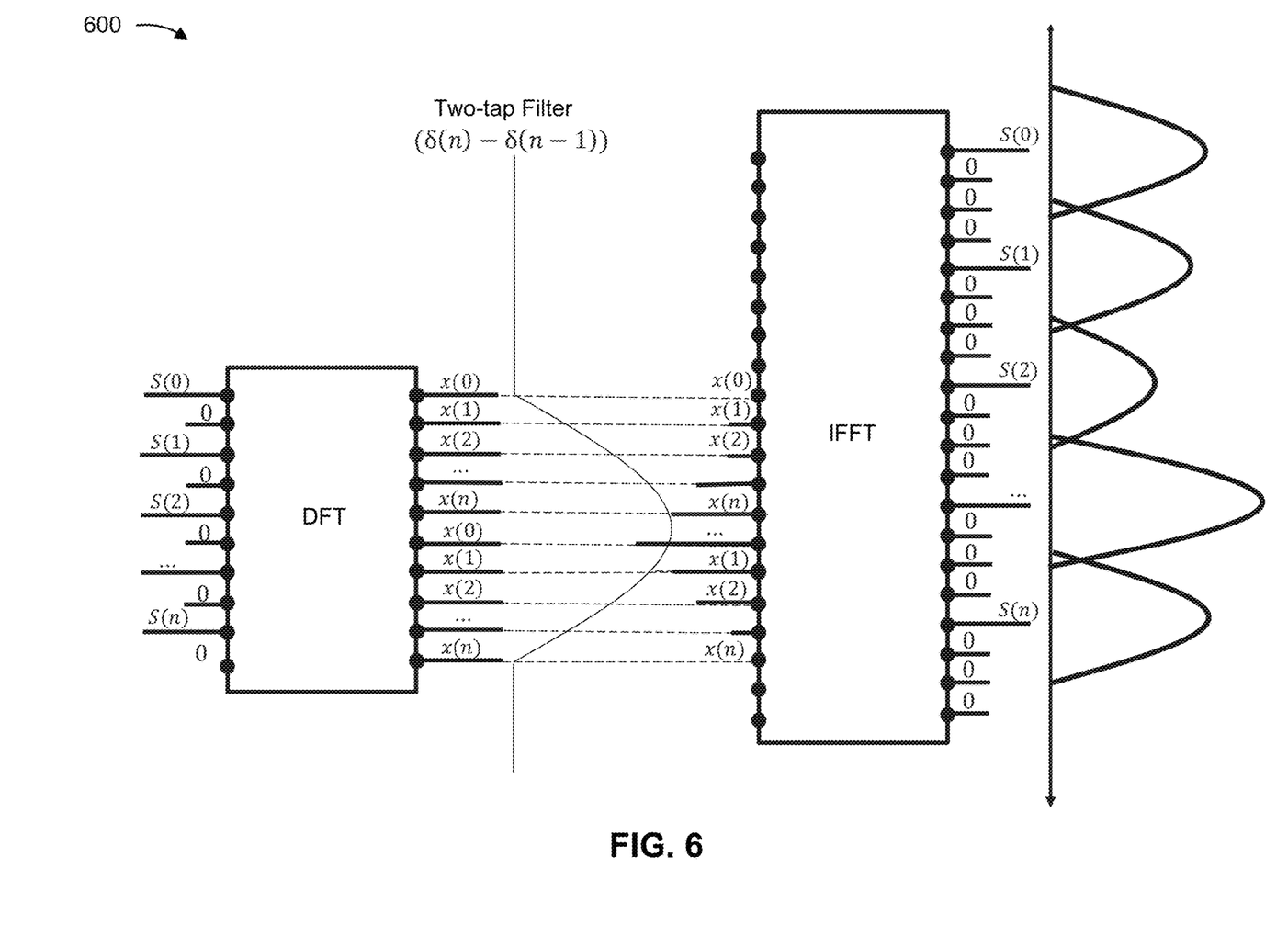
FIG. 6 is a diagram illustrating one or more examples of PAPR reduction, in accordance with the present disclosure.

FIG. 6 is a diagram illustrating an example 600 of PAPR reduction, in accordance with the present disclosure. FIG. 6 shows a frequency-domain representation of the reverse comb procedure described above in connection with FIGS. 5A and 5B.

As shown in FIG. 6, zero values may be inserted (e.g., uniformly inserted) into a signal (s(n)) (e.g., zero values may be inserted between bits of the signal, between constellation points of the signal, between symbols of the signal, and/or the like). As shown in FIG. 6, a DFT (x(n)) of the signal (s(n)) may be repeated. The repeated result of the DFT may be processed with a filter (e.g., a two-tap filter) in the frequency-domain, and an IFFT may be performed on the filtered repeated result of the DFT to obtain a time-domain waveform. As shown in FIG. 6, suppression of side lobes associated with the waveform may be improved (e.g., relative to a waveform generated when a DFT of a signal is not repeated).

As indicated above, FIG. 6 is provided as an example. Other examples may differ from what is described with respect to FIG. 6.

Figure 7:
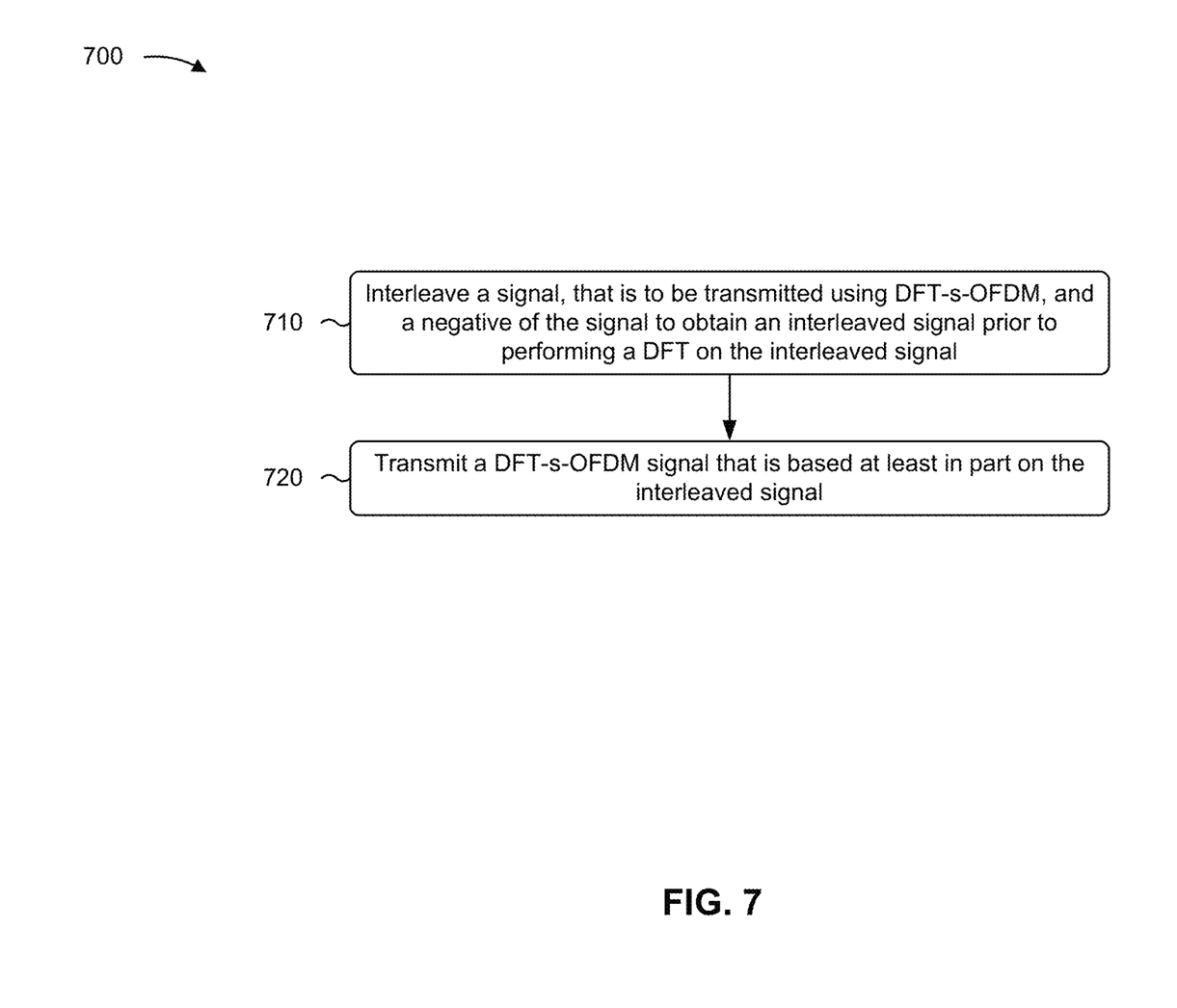
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120 and/or the like) performs operations associated with PAPR reduction.

As shown in FIG. 7, in some aspects, process 700 may include interleaving a signal, that is to be transmitted using DFT-s-OFDM, and a negative of the signal to obtain an interleaved signal prior to performing a DFT on the interleaved signal (block 710). For example, the UE (e.g., using transmit processor 264, controller/processor 280, memory 282, and/or the like) may interleave a signal, that is to be transmitted using DFT-s-OFDM, and a negative of the signal to obtain an interleaved signal prior to performing a DFT on the interleaved signal, as described above.

As further shown in FIG. 7, in some aspects, process 700 may include transmitting a DFT-s-OFDM signal that is based at least in part on the interleaved signal (block 720). For example, the UE (e.g., using controller/processor 280, transmit processor 264, TX MIMO processor 266, MOD 254, antenna 252, and/or the like) may transmit a DFT-s-OFDM signal that is based at least in part on the interleaved signal, as described above.

Process 700 may include additional aspects, such as any single aspect or any combination of aspects described below and/or in connection with one or more other processes described elsewhere herein.

In a first aspect, the signal is a data signal or a DMRS.

In a second aspect, alone or in combination with the first aspect, the signal is modulated by a phase shift keying modulation or QAM.

In a third aspect, alone or in combination with one or more of the first and second aspects, the signal and the negative of the signal are interleaved uniformly.

In a fourth aspect, alone or in combination with one or more of the first through third aspects, the negative of the signal is scaled, relative to the signal, by a scaling value.

In a fifth aspect, alone or in combination with one or more of the first through fourth aspects, process 700 includes performing the DFT on the interleaved signal, and performing an IFFT on a result of performing the DFT on the interleaved signal.

In a sixth aspect, alone or in combination with one or more of the first through fifth aspects, process 700 includes receiving an indication that the signal is to be interleaved with the negative of the signal.

In a seventh aspect, alone or in combination with one or more of the first through sixth aspects, the indication comprises a single bit in DCI, a MAC-CE, or RRC signaling.

In an eighth aspect, alone or in combination with one or more of the first through seventh aspects, process 700 includes amplifying a transmit power of the DFT-s-OFDM signal using a power amplifier.

In a ninth aspect, alone or in combination with one or more of the first through eighth aspects, a PAPR associated with the DFT-s-OFDM signal satisfies a threshold value.

In a tenth aspect, alone or in combination with one or more of the first through ninth aspects, the PAPR associated with the DFT-s-OFDM signal is less than a PAPR associated with a DFT-s-OFDM signal that is based at least in part on only the signal.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: interleaving a signal, that is to be transmitted using discrete Fourier transform (DFT) spread orthogonal frequency-division multiplexing (DFT-s-OFDM), and a negative of the signal to obtain an interleaved signal prior to performing a DFT on the interleaved signal; and transmitting a DFT-s-OFDM signal that is based at least in part on the interleaved signal.

Aspect 2: The method of Aspect 1, wherein the signal is a data signal or a demodulation reference signal.

Aspect 3: The method of any of Aspects 1-2, wherein the signal is modulated by a phase shift keying modulation or quadrature amplitude modulation (QAM).

Aspect 4: The method of any of Aspects 1-3, wherein the signal and the negative of the signal are interleaved uniformly.

Aspect 5: The method of any of Aspects 1-4, wherein the negative of the signal is scaled, relative to the signal, by a scaling value.

Aspect 6: The method of any of Aspects 1-5, further comprising: performing the DFT on the interleaved signal; and performing an inverse fast Fourier transform on a result of performing the DFT on the interleaved signal.

Aspect 7: The method of any of Aspects 1-6, further comprising: receiving an indication that the signal is to be interleaved with the negative of the signal.

Aspect 8: The method of Aspect 7, wherein the indication comprises a single bit in downlink control information, a medium access control control element, or radio resource control signaling.

Aspect 9: The method of any of Aspects 1-8, further comprising: amplifying a transmit power of the DFT-s-OFDM signal using a power amplifier.

Aspect 10: The method of any of Aspects 1-9, wherein a peak-to-average power ratio (PAPR) associated with the DFT-s-OFDM signal satisfies a threshold value.

Aspect 11: The method of Aspect 10, wherein the PAPR associated with the DFT-s-OFDM signal is less than a PAPR associated with a DFT-s-OFDM signal that is based at least in part on only the signal.

Aspect 12: An apparatus for wireless communication at a device, comprising a processor; memory coupled with the processor; and instructions stored in the memory and executable by the processor to cause the apparatus to perform the method of one or more Aspects of Aspects 1-11.

Aspect 13: A device for wireless communication, comprising a memory and one or more processors coupled to the memory, the memory and the one or more processors configured to perform the method of one or more Aspects of Aspects 1-11.

Aspect 14: An apparatus for wireless communication, comprising at least one means for performing the method of one or more Aspects of Aspects 1-11.

Aspect 15: A non-transitory computer-readable medium storing code for wireless communication, the code comprising instructions executable by a processor to perform the method of one or more Aspects of Aspects 1-11.

Aspect 16: A non-transitory computer-readable medium storing a set of instructions for wireless communication, the set of instructions comprising one or more instructions that, when executed by one or more processors of a device, cause the device to perform the method of one or more Aspects of Aspects 1-11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors operatively coupled to the memory, the memory and the one or more processors configured to:
interleave a signal, that is to be transmitted using discrete Fourier transform (DFT) spread orthogonal frequency-division multiplexing (DFT-s-OFDM), and a negative of the signal to obtain an interleaved signal prior to performing a DFT on the interleaved signal, wherein the signal and the negative of the signal are interleaved uniformly in the interleaved signal; and
transmit a DFT-s-OFDM signal that is based at least in part on the interleaved signal.

2. The UE of claim 1, wherein the signal is a data signal or a demodulation reference signal.

3. The UE of claim 1, wherein the signal is modulated by a phase shift keying modulation or quadrature amplitude modulation (QAM).

4. The UE of claim 1, wherein the negative of the signal is scaled, relative to the signal, by a scaling value.

5. The UE of claim 1, wherein the one or more processors are further configured to:
perform the DFT on the interleaved signal; and
perform an inverse fast Fourier transform on a result of performing the DFT on the interleaved signal.

6. The UE of claim 1, wherein the one or more processors are further configured to:
receive an indication that the signal is to be interleaved with the negative of the signal.

7. The UE of claim 6, wherein the indication comprises a single bit in downlink control information, a medium access control control element, or radio resource control signaling.

8. The UE of claim 1, wherein the one or more processors are further configured to:
amplify a transmit power of the DFT-s-OFDM signal using a power amplifier.

9. The UE of claim 1, wherein a peak-to-average power ratio (PAPR) associated with the DFT-s-OFDM signal satisfies a threshold value.

10. The UE of claim 9, wherein the PAPR associated with the DFT-s-OFDM signal is less than a PAPR associated with a DFT-s-OFDM signal that is based at least in part on only the signal.

11. A method of wireless communication performed by a user equipment (UE), comprising:
interleaving a signal, that is to be transmitted using discrete Fourier transform (DFT) spread orthogonal frequency-division multiplexing (DFT-s-OFDM), and a negative of the signal to obtain an interleaved signal prior to performing a DFT on the interleaved signal, wherein the signal and the negative of the signal are interleaved uniformly in the interleaved signal; and
transmitting a DFT-s-OFDM signal that is based at least in part on the interleaved signal.

12. The method of claim 11, wherein the signal is a data signal or a demodulation reference signal.

13. The method of claim 11, wherein the signal is modulated by a phase shift keying modulation or quadrature amplitude modulation (QAM).

14. The method of claim 11, wherein the negative of the signal is scaled, relative to the signal, by a scaling value.

15. The method of claim 11, further comprising:
performing the DFT on the interleaved signal; and
performing an inverse fast Fourier transform on a result of performing the DFT on the interleaved signal.

16. The method of claim 11, further comprising:
receiving an indication that the signal is to be interleaved with the negative of the signal.

17. The method of claim 16, wherein the indication comprises a single bit in downlink control information, a medium access control control element, or radio resource control signaling.

18. The method of claim 11, further comprising:
amplifying a transmit power of the DFT-s-OFDM signal using a power amplifier.

19. The method of claim 11, wherein a peak-to-average power ratio (PAPR) associated with the DFT-s-OFDM signal satisfies a threshold value.

20. The method of claim 19, wherein the PAPR associated with the DFT-s-OFDM signal is less than a PAPR associated with a DFT-s-OFDM signal that is based at least in part on only the signal.

21. An apparatus for wireless communication, comprising:
means for interleaving a signal, that is to be transmitted using discrete Fourier transform (DFT) spread orthogonal frequency-division multiplexing (DFT-s-OFDM), and a negative of the signal to obtain an interleaved signal prior to performing a DFT on the interleaved signal, wherein the signal and the negative of the signal are interleaved uniformly in the interleaved signal; and
means for transmitting a DFT-s-OFDM signal that is based at least in part on the interleaved signal.

22. The apparatus of claim 21, further comprising:
means for performing the DFT on the interleaved signal; and
means for performing an inverse fast Fourier transform on a result of performing the DFT on the interleaved signal.

23. The apparatus of claim 21, further comprising:
means for receiving an indication that the signal is to be interleaved with the negative of the signal.

24. The apparatus of claim 23, wherein the indication comprises a single bit in downlink control information, a medium access control control element, or radio resource control signaling.

25. A non-transitory computer-readable medium storing a set of instructions for wireless communication, the set of instructions comprising:
one or more instructions that, when executed by one or more processors of a user equipment (UE), cause the UE to:
interleave a signal, that is to be transmitted using discrete Fourier transform (DFT) spread orthogonal frequency-division multiplexing (DFT-s-OFDM), and a negative of the signal to obtain an interleaved signal prior to performing a DFT on the interleaved signal, wherein the signal and the negative of the signal are interleaved uniformly in the interleaved signal; and
transmit a DFT-s-OFDM signal that is based at least in part on the interleaved signal.

26. The non-transitory computer-readable medium of claim 25, wherein the one or more instructions further cause the UE to:
perform the DFT on the interleaved signal; and
perform an inverse fast Fourier transform on a result of performing the DFT on the interleaved signal.

27. The non-transitory computer-readable medium of claim 25, wherein the one or more instructions further cause the UE to:
receive an indication that the signal is to be interleaved with the negative of the signal.

28. The non-transitory computer-readable medium of claim 27, wherein the indication comprises a single bit in downlink control information, a medium access control control element, or radio resource control signaling.

* * * * *